3,562,059
DECORATION OF POLYETHYLENE AND POLYURETHANE FOAM

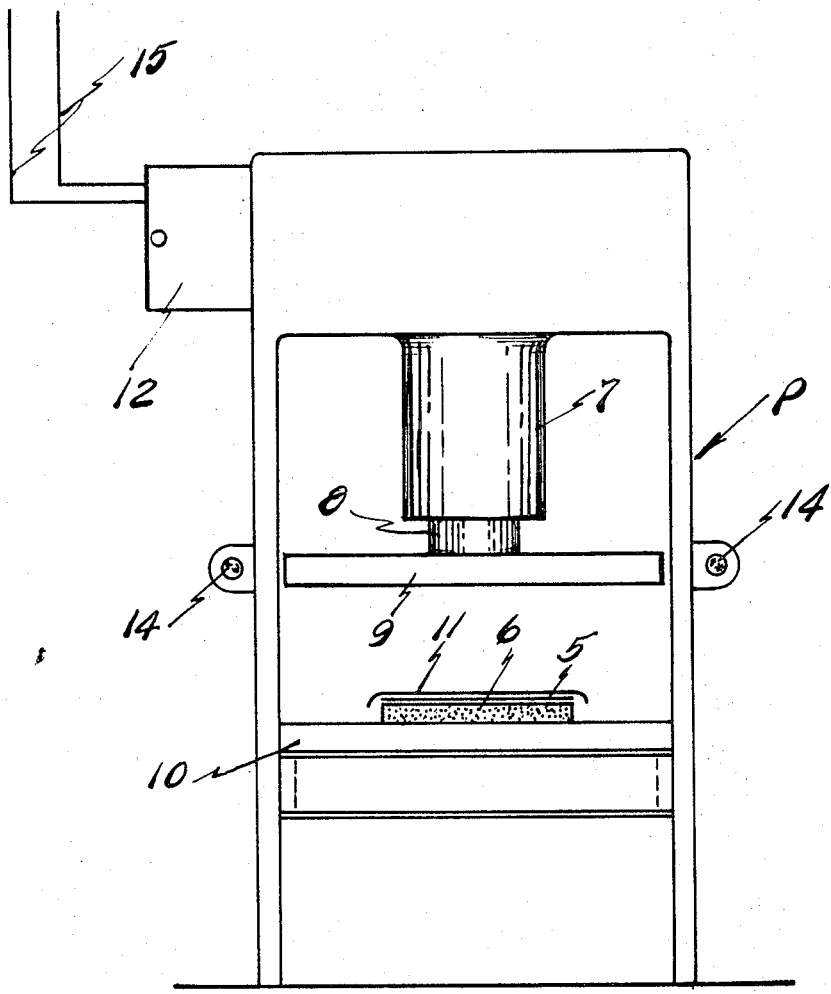

Carl F. Gladen, 3667 Kawkawlin River Drive, Bay City, Mich. 48706
Continuation-in-part of application Ser. No. 326,865, Nov. 29, 1963. This application Aug. 21, 1967, Ser. No. 668,985
Int. Cl. B32b 5/20, 31/12
U.S. Cl. 156—323                                3 Claims

ABSTRACT OF THE DISCLOSURE

A method of decorating plastic foam wherein a printed face of a film strip is placed against the foam, a strip of woven cloth is applied over the film strip, heat and pressure are applied to the face of the cloth, and the cloth is then stripped.

---

This invention relates to a process for the application of decorations of one or more colors to plastics such as polyurethane polystyrene and/or polyethylene foam, and the application is a continuation-in-part of my application, Ser. No. 326,865, filed Nov. 29, 1963, now abandoned. Heretofore plastics such as polyurethane polyethylene and polystyrene foam have not been successfully decorated without prior treatment of the material, one example being a flame treatment described in U.S. Letters Patent No. 2,648,097, which consists in passing a slightly oxidizing flame over the surface to be decorated. This process must be carefully controlled to prevent distortion of the part and area to be treated and/or distortion of surface cell structure.

It is a prime object of the invention to provide a process in which a film can be printed in intricate designs in multi-colors and applied to the face of plastic foams such as polyethylene foam, polyurethane foam, and polystyrene foam, and imprinted thereon in a process which produces a highly decorative textured surface on a high productive basis with a minimum of cost and labor.

The single view in the drawing is a front elevational view of a press, etc., for carrying out the invention.

In practicing the instant process, I first print a strip of plastic film such as polyethylene film 5 using a conventional printing process such as a flexographic process substantially similar to that used in the printing industry for the printing of polyethylene foam. Alcohol base inks and other conventional inks of the type disclosed in U.S. Pats. 3,049,463 and 2,920,009 may be used. Intricate designs in multi-colors can be printed on the transparent polyethylene film, these designs, etc., being printed backwards or reversed so that they appear right side up when applied. This printed film is then blanked to the shape of the foam form 6 to be decorated, and the decorated film is next laid over the surface of the foam to be decorated.

The next step is to insert the piece of foam with the printed film properly positioned thereon into a press P which is provided with an air or hydraulic cylinder 7 having a piston 8 on which a heated platen 9 is mounted. A work table 10 is provided as usual and, when the film and foam are placed in position and covered by a teflon cloth 11, which is a releasing agent, the press is ready for operation. The platen 9 is heated to a range of between 240° F. and 350° F. A timer 12 is provided on the press which also is provided with a control button 14 and wires 15 lead to any convenient source of power supply.

In practice, the press is closed to hold the film tightly in position and exert a pressure sufficient to bond the film to the foam, the press being held closed for a period of time necessary to bond the film to the foam, after which the press is opened and the cloth 11 is removed. The foam now is a completely decorated part, and the woven teflon cloth covering the platen also leaves a fine screen texture and adds generally to the eye appeal appearance. In addition, the edges of the film blend into the foam, and the foam and film are perfectly bonded together because they are the same chemical composition, and the process also serves to smooth the surface of the foam.

EXAMPLE

A polyethylene film strip is printed using rubber plates with an alcohol base ink such as conventionally used for printing polyethylene bags. A pressure of from 3 to 7 p.s.i. is applied to the teflon cloth, applied over the film and polyethylene foam at a temperature of 250° F. for a period of 2 to 5 seconds. The teflon cloth is then peeled off.

Substantially the same process is used for the application of decorations in one or more colors to polystyrene and polyurethane.

From the foregoing description, it will be obvious that I have perfected a very simple and inexpensive method for application of decorations in one or more colors to polystyrene foam and polyethylene foam.

What I claim is:
1. A method of decorating the surface of a formed body of a formed polymer, said method comprising placing directly on the surface of said formed body a polymeric film having one printed face with the printed face facing said surface; placing a release agent in overlying relation with said film; simultaneously applying heat and pressure to said body through said release agent and said film; and removing said release agent said foamed polymer being selected from the group consisting of polyethylene and polyurethane said polymeric film being polyethylene.
2. The method set forth in claim 1 wherein said polymer is polyethylene.
3. The method set forth in claim 1 wherein said polymer is polyurethane.

References Cited

UNITED STATES PATENTS

| 2,710,046 | 6/1955  | Markus         | 156—3.23X |
| 2,845,541 | 7/1958  | Berry          | 161—252UX |
| 3,049,463 | 8/1962  | Kallander      | 156—230   |
| 3,213,071 | 10/1965 | Campbell       | 161—252X  |
| 2,956,723 | 10/1960 | Tritsch        | 229—48    |
| 3,234,066 | 2/1966  | Mulholland     | 156—244   |
| 3,303,081 | 2/1967  | Michaelson et al. | 156—219 |
| 3,137,609 | 6/1964  | Blaska         | 161—2     |
| 3,257,263 | 6/1966  | Miller         | 161—119   |

JOHN T. GOOLKASIAN, Primary Examiner
G. W. MOXON II, Assistant Examiner

U.S. Cl. X.R.
156—78, 277, 289, 313, 323; 161—160; 264—132

UNITED STATES PATENT OFFICE
CERTIFICATE OF CORRECTION

Patent No. 3,562,059　　　　　　　　Dated February 9, 1971

Inventor(s) Carl F. Gladen

It is certified that error appears in the above-identified patent and that said Letters Patent are hereby corrected as shown below:

Column 1, line 36, "formed" should read -- foamed --.

Signed and sealed this 17th day of August 1971.

(SEAL)
Attest:

EDWARD M. FLETCHER, JR.　　　　　　WILLIAM E. SCHUYLER,
Attesting Officer　　　　　　　　　　Commissioner of Patent

UNITED STATES PATENT OFFICE
CERTIFICATE OF CORRECTION

Patent No. 3,562,059     Dated February 9, 1971

Inventor(s) Carl F. Gladen

It is certified that error appears in the above-identified patent and that said Letters Patent are hereby corrected as shown below:

Column 2, line 36, "formed" should read -- foamed --.

This certificate supersedes Certificate of Correction issued August 17, 1971.

Signed and sealed this 23rd day of May 1972.

(SEAL)
Attest:

EDWARE M. FLETCHER, JR.
Attesting Officer

ROBERT GOTTSCHALK
Commissioner of Patents